United States Patent Office 3,218,362
Patented Nov. 16, 1965

3,218,362
PREPARATION OF PROPARGYL ALCOHOL
George L. Moore, South Plainfield, N.J., assignor, by mesne assignments, to Cumberland Chemical Corporation, New York, N.Y., a corporation of Delaware
No Drawing. Filed Apr. 14, 1961, Ser. No. 102,929
3 Claims. (Cl. 260—638)

This invention relates to a process for producing propargyl alcohol in high yields with a minimum formation of by-product 2-butyne-1,4-diol.

Various methods for preparing propargyl alcohol and 2-butyne-1,4-diol have been previously reported. One method is to react aqueous formaldehyde with acetylene in the presence of a copper acetylide catalyst. Although the relative amounts of propargyl alcohol and 2-butyne-1,4-diol can be varied to some extent depending upon the pressure and temperature employed, this method produces a product consisting predominantly of 2-butyne-1,4-diol and only relatively small amounts of propargyl alcohol. A further disadvantage of this process is that it is difficult to recover anhydrous propargyl alcohol from the aqueous reaction medium. In another process acetylene is reacted with formaldehyde at very high pressures, approximately 1000 lbs. per square inch, to form a mixture of propargyl alcohol and 2-butyne-1,4-diol. The reaction is carried out entirely in the liquid phase so as to minimize the dangers in using acetylene at high pressures. Both of the processes suffer from the disadvantage that substantial quantities of 2-butyne-1,4-diol are produced simultaneously with propargyl alcohol.

According to the present invention propargyl alcohol is prepared by reacting anhydrous paraformaldehyde with acetylene in an inert anhydrous organic liquid reaction medium in the presence of a copper acetylide catalyst at a pressure in the range of about 50 to 350 p.s.i.g. and a temperature in the range of about 85 to 140° C. Propargyl alcohol is obtained in high conversions and yields, with substantially smaller amounts of by-product 2-butyne-1,4-diol than the amounts in prior art processes.

The highest ratios of propargyl alcohol to 2-butyne-1,4-diol are obtained when the initial reaction temperature is about 85 to 100° C. and the reaction mixture is gradually heated at a substantially uniform rate to a temperature of about 110 to 140° C., preferably about 115° to 125° C. Heating is continued over a period ranging from about 1½ to 4 hours, at a substantially uniform rate of about 8° to 12° C. per hour. The reaction mixture is then maintained at 110 to 140° C. and acetylene is introduced until there is substantially no further uptake of acetylene. The total reaction time is generally from about 3 to about 5 hours, although in some instances it may be either shorter or longer.

In an alternative embodiment, the reaction temperature is maintained substantially constant in the range of about 85 to 140° C. throughout the reaction; otherwise, the procedure is the same as above described. The alternative embodiment has the disadvantage previously indicated that less propargyl alcohol and more 2-butyne-1,4-diol is formed than in the preferred embodiment.

Various inert anhydrous organic liquids can be used as the reaction medium. A preferred reaction medium is dimethyl formamide, since high yields of propargyl alcohol with a minimum formation of by-product 2-butyne-1,4-diol is obtained with this solvent. Other organic solvents which are known in the art, such as ethylene diacetate, cyclohexanone, methylal, tetrahydrofuran, and 1,4-dioxane, can be used although with somewhat less favorable results.

It is essential to carry out the present process under elevated pressure, since the yield of propargyl alcohol is very small at atmospheric pressure. The reaction can be carried out with high yields of propargyl alcohol at total pressures in the range of about 50 to 350 p.s.i.g. At pressures below about 50 p.s.i.g. the yield of propargyl alcohol is undesirably low and decreases rapidly with decreasing pressure. Pressures above about 350 p.s.i.g. do not significantly increase the amount of propargyl alcohol obtained and do increase the safety hazards. Pressures within the range of 50 to 350 p.s.i.g. favor the production of propargyl alcohol and at the same time do not present substantial safety hazards. It is desirable in order to insure safe operation, to dilute the acetylene with nitrogen, the percentage of nitrogen increasing as the total pressure is increased. Mixtures of gaseous acetylene and nitrogen containing about 25 to about 35 percent by volume of nitrogen are desirable for this purpose. The partial pressure of acetylene in the present process is generally in the range of about 40 to 250 p.s.i.g.

Cuprous acetylide is the preferred catalyst in the present invention. The catalyst may be supported on any one of various conventional catalyst supports, such as finely divided activated carbon, silica, alumina-silica composites, alumina, fuller's earth, and the like, all of which are known in the art. In view of the explosive nature of cuprous acetylide, it is desirable that the concentration of catalyst not exceed 20 percent of the combined weight of catalyst and support. Catalytic activity is obtainable with catalyst concentrations as low as 2 percent, and sometimes even lower. Generally, the catalyst concentration is in the neighborhood of about 4 to 15 percent.

The invention will now be described in detail with reference to the following specific embodiments.

Example I

An autoclave was purged with nitrogen, and 80 grams of catalyst consisting of cuprous acetylide supported on activated carbon was charged to the autoclave. The catalyst was prepared as follows: 120 ml. of concentrated (29 percent) aqueous ammonium hydroxide, 3.0 g. of ammonium chloride, and 390 ml. of distilled water were charged to a reactor. Nitrogen was bubbled through the solution while stirring to remove dissolved oxygen. Then 20.2 g. (0.102 mole) of cuprous chloride was dissolved in the solution. 10 g. of hydroxylamine hydrochloride dissolved in 20 ml. of distilled water was added, and the solution was sparged with nitrogen to remove air. 59 g. of finely divided (200 mesh or finer) activated carbon from which all adsorbed oxygen had been removed was added to the solution. A slight exothermic effect raised the temperature to about 30° C. The mixture was stirred for 3 hours, and then acetylene was introduced into the mixture for 2.5 hours. The mixture was allowed to stand overnight in a closed system.

After the addition of catalyst, 200 ml. of dimethyl formamide was added and the catalyst slurried therein. To this slurry was added 45.0 g. (equivalent to 1.5 moles of formaldehyde monomer) of paraformaldehyde with stirring. The autoclave was assembled, and purged three times with nitrogen. Nitrogen was charged until a pressure of 85 p.s.i.g. was reached and simultaneously the reaction mixture was heated to 79° C.; this required about 20 minutes. Acetylene was then added slowly to the reaction mixture, causing a pressure and temperature rise to 285 p.s.i.g. and 94° C. in about 20 minutes. The reaction medium was gradually heated over a period of about 5.5 hours to a temperature of 120° C., and the pressure was maintained at 250 to 285 p.s.i.g. during this period by introducing acetylene from a cylinder as needed to replace acetylene undergoing reaction. The acetylene was shut off when acetylene uptake had substantially ceased. The total reaction time was approximately 6 hours. The reaction product mixture contained 35.4 g.

(0.632 mole) of propargyl alcohol and 17.4 g. (0.202 mole) of 2-butyne-1,4-diol, representing conversions of 42.1 percent and 26.9 percent of the reagent formaldehyde to propargyl alcohol and 2-butyne-1,4-diol, respectively. In addition, 5.2 percent (2.34 g., 0.078 mole) of formaldehyde was recovered from the reaction mixture.

*Example II*

To an autoclave which had been purged with nitrogen were charged 77.3 g. of cuprous acetylide on carbon catalyst prepared as described in Example I, 200 ml. of dimethyl formamide, 0.03 ml. of concentrated sulfuric acid, 1.5 g. of diphenylamine, and 45.0 g. (1.5 moles) of paraformbaldehyde in the order named, with stirring after the addition of each ingredient. The autoclave was purged with nitrogen, assembled, and again purged with nitrogen. Nitrogen was charged while heating until a pressure of 94 p.s.i.g. and a temperature of 90° C. were reached. Then acetylene was added to the reaction mixture slowly, and in 12 minutes the pressure had risen to 274 p.s.i.g. while the temperature had dropped to 85° C. The reaction mixture was heated to a temerature of about 110° C. over a period of about 2¾ hours, and the pressure was held substantially constant (about 275 to 290 p.s.i.g.) throughout this period. The temperature was then held substantially constant (110 to 120° C.) and the pressure substantially constant at about 280 to 285 p.s.i.g. for an additional period of about 3½ hours, while acetylene was introduced as needed. The total reaction time was slightly over 6 hours. The acetylene was shut off and the reaction mixture was allowed to stand overnight. 2.5 percent of the total formaldehyde charged was recovered by distillation. There were obtained 44.4 g. (0.794 mole) of propargyl alcohol and 16.7 g. (0.194 mole) of 2-butyne-1,4-diol, representing conversions of 52.9 percent and 25.9 percent of the formaldehyde to propargyl alcohol and 2-butyne-1,4-diol, respectively.

*Example III*

To an autoclave which had been purged with nitrogen were charged 200 ml. of dimethyl formamide, 71 g. of catalyst consisting of cuprous acetylide supported on a finely divided silica-alumina composite, 0.045 ml. of concentrated sulfuric acid, and 45 g. (1.5 moles) of paraformaldehyde which had been heated for 2½ hours at 100° C. in a nitrogen atmosphere. The autoclave was again purged with nitrogen. Nitrogen was charged while the reaction mixture was heated, until a temperature of 85° C. and a pressure of 85 p.s.i.g. were attained. Acetylene was then adde slowly while heating was continued, until a temperature of 92° C. and a pressure of 255 p.s.i.g. were reached. The reaction mixture was gradually heated over a period of about 3 hours to about 120° C., while acetylene was added slowly and the pressure maintained at about 255 to 270 p.s.i.g. Then the temperature and pressure were both held substantially constant (at 121 to 128° C. and 254 to 264 p.s.i.g., respectively), while acetylene was introduced as needed for an additional 1½ hours. The acetylene was then shut off and the autoclave allowed to stand under pressure and cool slowly overnight. There were obtained 34.5 g. (0.616 mole) of propargyl alcohol and 12.6 g. (0.147 mole) of 2-butyne-1,4-diol, representing conversions of 41.1 percent and 19.6 percent of formaldehyde to propargyl alcohol and 2-butyne-1,4-diol, respectively.

Examples I through II are illustrative of the preferred procedure of this invention, wherein the reaction temperature is initially in the range or about 85 to 100° C. and the reaction medium gradually heated to a temperature in the range of about 110° to about 140° C. The next two examples describe an alternative procedure in which the reaction temperature is maintained substantially constant throughout the reaction.

*Example IV*

An autoclave was purged with nitrogen, and then 200 ml. of dimethyl formamide and 0.085 ml. of concentrated sulfuric acid were added. To this solution was added 77.4 g. of catalyst consisting of cuprous acetylide supported on carbon. To the resulting slurry was added 70.0 g. (2.33 moles) of paraformaldehyde. The autoclave was assembled, purged with nitrogen, and then nitrogen was charged until the pressure was 70 p.s.i.g. Simultaneously with the charge of nitrogen, the autoclave contents were heated to 118° C. Acetylene was then introduced slowly over a period of 5 minutes until a pressure of 212 p.s.i.g. and a temperature of 121° C. were attained. Acetylene was then introduced over a period of 4½ hours while the temperature was maintained substantially constant at 115 to 128° C. and the pressure substantially constant at 208 to 218 p.s.i.g. The acetylene was then shut off and the reaction mixture allowed to cool slowly while standing under pressure for about 3 days. There were obtained 56.0 g. (1.00 mole) of propargy alcohol and 42.6 g. (0.495 mole) of 2-butyne-1,4-diol, representing conversions of 42.9 percent and 42.4 percent of the formaldehyde to propargyl alcohol and 2-butyne-1,4-diol, respectively. In addition 2.94 g. (0.098 mole) of unreacted formaldehyde representing 4.2 precent of the total amount charged, was recovered by distillation.

*Example V*

The autoclave was purged with nitrogen, and 80.1 g. of catalyst consisting of cuprous acetylide of finely divided carbon, and 200 ml. of dimethyl formamide, 0.035 ml. of concentrated sulfuric acid, and 45 g. (1.5 moles) of paraformaldehyde, were charged with stirring. The autoclave was assembled and purged with nitrogen. Nitrogen was then charged until a pressure of about 80 p.s.i.g. was reached, simultaneously the solution was heated to about 140° C. Acetylene was then introduced rapidly until the pressure was 180 p.s.i.g. and the temperature was 145° C. The solution was cooled to 136° C. and additional acetylene introduced slowly until the pressure was 233 p.s.i.g. The temperature was then held substantially constant at 136 to 140° C. and the pressure substantially constant at 228 to 233 p.s.i.g. for about 4½ hours. During this time acetylene was introduced as needed to maintain the pressure. Acetylene addition was then stopped, and the system allowed to stand under pressure while cooling slowly overnight. There were obtained 31.1 g. (0.555 mole) of propargyl alcohol and 17.2 g. (0.200 mole) of 2-butyne-1,4-diol, representing conversions of 37.0 percent and 26.7 percent of the formaldehyde to propargyl alcohol and 2-butyne-1,4-diol, respectively. In addition 1.72 g. (0.0585 mole) of unreacted formaldehyde, representing 3.9 percent of the total amount charged, was recovered.

While the invention has been described with respect to specific embodiments thereof, it is understood that the scope of this invention is measured only by the scope of the appended claims.

I claim:

1. A process for producing propargyl alcohol in the presence of lesser amounts of 2-butyne-1,4-diol by reacting paraformaldehyde and acetylene which comprises contacting anhydrous paraformaldehyde with acetylene in an inert organic liquid reaction medium consisting of anhydrous dimethyl formamide, said reaction medium containing a cuprous acetylide catalyst supported on a solid carrier selected from the group consisting of activated carbon and silica-alumina composites, said cuprous acetylide comprising from about 4 percent to about 15 percent by weight of the total weight of said catalyst and said carrier, conducting said reaction at a pressure in the range of about 50 p.s.i.g. to about 350 p.s.i.g. and at a partial pressure of acetylene in the range of about 40 p.s.i.g. to about 250 p.s.i.g. maintaining the reaction mixture at an initial reaction temperature in the range of about 85° C. to about 100° C., heating said reaction mixture to increase its temperature at a substantially uniform rate of about 8° C. to about 12° C. per hour, said heating being sufficient to increase said reaction mixture temperature to about from 115° C. to about 125° C., said heating being completed in a period of not less than about 1.5 hours, and maintaining said heated reaction mixture in the range of about 115° C. to about 125° C. until the reaction is substantially complete.

2. A process according to claim 1 in which the solid carrier is finely divided activated carbon.

3. A process according to claim 1 in which the solid carrier is a finely divided composite of silica and alumina.

References Cited by the Examiner

UNITED STATES PATENTS

| | | | |
|---|---|---|---|
| 2,232,867 | 2/1941 | Reppe et al. | 260—638 |
| 2,487,006 | 11/1949 | Walker et al. | 260—638 |
| 2,712,560 | 7/1955 | McKinley et al. | 260—638 |
| 3,087,970 | 4/1963 | Moore et al. | 260—638 |

FOREIGN PATENTS 508,062  6/1939  Great Britain.

LEON ZITVER, *Primary Examiner.*

UNITED STATES PATENT OFFICE
CERTIFICATE OF CORRECTION

Patent No. 3,218,362                      November 16, 1965

George L. Moore

It is hereby certified that error appears in the above numbered patent requiring correction and that the said Letters Patent should read as corrected below.

Column 3, lines 13 and 14, for "paraformbaldehyde" read -- paraformaldehyde --; line 51, for "adde" read -- added --; line 68, for "II" read -- III --; line 70, for "or" read -- of --.

Signed and sealed this 23rd day of August 1966.

(SEAL)
Attest:

ERNEST W. SWIDER                      EDWARD J. BRENNER
Attesting Officer                        Commissioner of Patents